United States Patent
Dao et al.

[19]

[11] Patent Number: 6,073,312

[45] Date of Patent: Jun. 13, 2000

[54] COLLAPSIBLE KNOB ASSEMBLY AND RETAINING SPRING THEREFOR

[75] Inventors: Phuc Ba Dao, Indianapolis; Douglas Scott Vanbibber, Greentown; James Norman Miller, Sharpsville, all of Ind.

[73] Assignee: Delco Electronics Corporation, Kokomo, Ind.

[21] Appl. No.: 08/799,056

[22] Filed: Feb. 10, 1997

[51] Int. Cl.[7] .................................................. A47B 95/02
[52] U.S. Cl. .............................................................. 16/441
[58] Field of Search .................................. 16/121, 114 R, 16/DIG. 40, DIG. 41; 74/553; 267/158, 163

[56] References Cited

U.S. PATENT DOCUMENTS

| | | | |
|---|---|---|---|
| 2,316,918 | 4/1943 | Wallace | 16/121 |
| 2,574,330 | 11/1951 | Judd | 16/121 |
| 3,329,452 | 7/1967 | Ammon | 74/553 |
| 3,336,059 | 8/1967 | Leitmann | 16/121 |
| 3,338,604 | 8/1967 | Van Buren, Jr. | 16/121 |
| 3,425,723 | 2/1969 | Parkin et al. | 287/53 |
| 3,805,637 | 4/1974 | Keeling, Jr. | 74/553 |
| 4,127,342 | 11/1978 | Coggiola | 74/553 |
| 5,537,893 | 7/1996 | Snider | 74/553 |

FOREIGN PATENT DOCUMENTS 107790  6/1939  Australia .................. 16/121

*Primary Examiner*—Chuck Y. Mah
*Attorney, Agent, or Firm*—Jimmy L. Funke

[57] ABSTRACT

A D-shaped retaining spring couples a knob to a shaft. The spring has a flange abutting the end face of the knob to fix the spring position in a cavity of the knob. Alternatively, instead of the flange, the inner end of the spring abuts a shoulder in the cavity to fix the spring position. In either case, the inner end of the spring has a tab extending radially inward at a location spaced from the cavity end wall to define a stop for the end of the shaft thereby holding the knob where it can protrude from an instrument panel for normal operation. An axial impact force on the knob causes the tab to yield, allowing the knob to slide further onto the shaft and into the panel for the purpose of avoiding injury due to striking the knob during a crash.

15 Claims, 1 Drawing Sheet

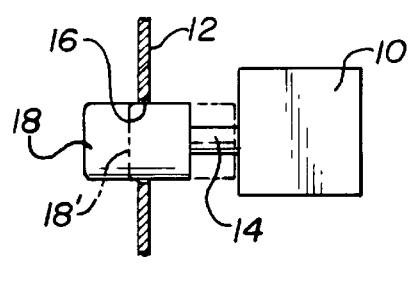
FIG-1
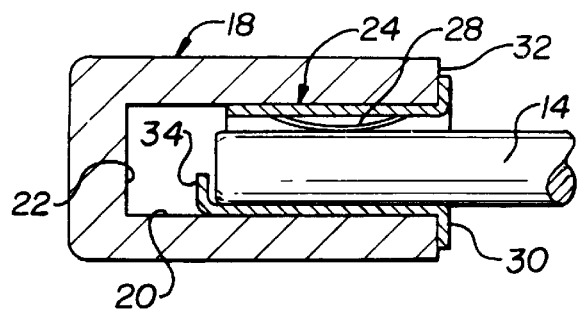
FIG-2
FIG-3
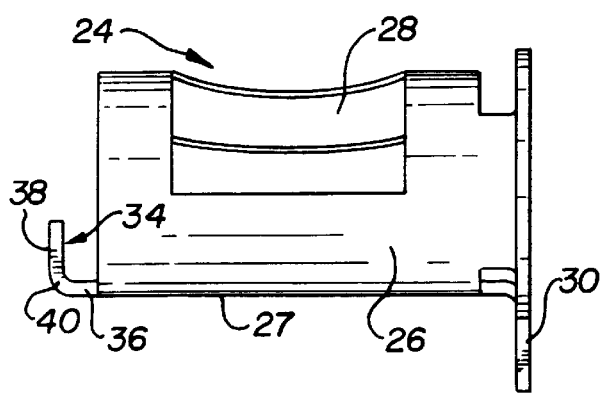
FIG-4
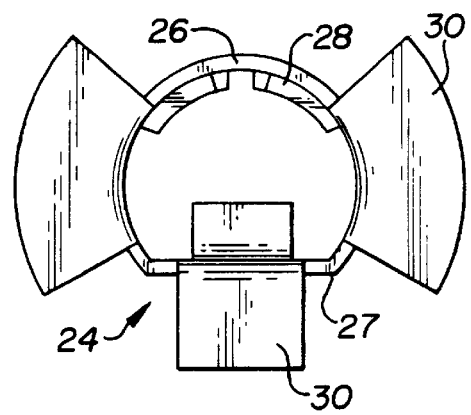
FIG-5
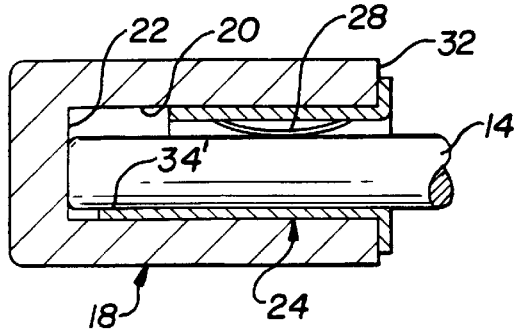
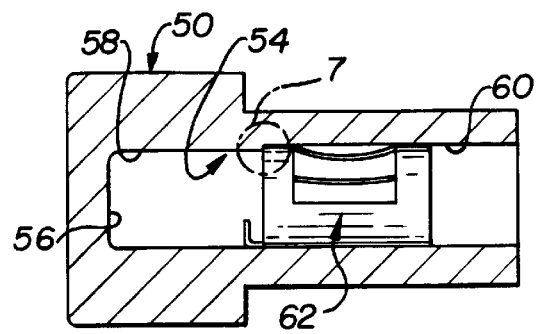
FIG-6
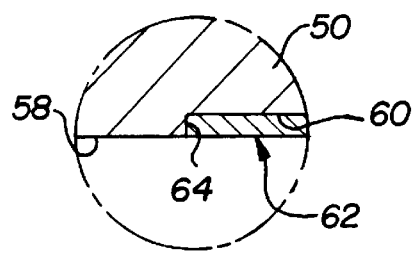
FIG-7

COLLAPSIBLE KNOB ASSEMBLY AND RETAINING SPRING THEREFOR

FIELD OF THE INVENTION

This invention relates to a knob assembly and retaining spring for an actuator shaft and particularly having the ability to collapse under an axial force.

BACKGROUND OF THE INVENTION

In automotive instrument panels knobs are used for manual adjustment of controls or actuators such as for heating and cooling systems or radio systems. If the knobs project from the panel and are rigidly fixed, they provide a potential hazard in the event a person is thrown forward during a crash to strike his head against the panel. In some countries it is required that a fixed knob may project only a limited distance from the panel surface; this requirement makes it difficult to grasp the knob. To overcome this limitation and to make a single knob assembly suitable for all countries, it is desirable to provide an arrangement which permits a knob to extend out from the panel for easy manipulation but allows the knob to collapse toward the panel when subject to an axial force which is lower than that which would cause head injury.

SUMMARY OF THE INVENTION

It is therefore an object of the invention to mount a knob on an actuator shaft at a desired axial position on the shaft and subject to collapsing to another position when subjected to a given axial force. Another object is to include in a knob retaining spring a feature which will hold a knob in a desired position and which yields under an axial force to permit collapsing of the knob on its shaft.

The objects are accomplished by a retaining spring which surrounds an actuator shaft to hold the shaft in the cavity of a knob. A flange on the retaining spring abuts the outer knob surface to establish the position of the spring in the cavity. A yieldable tab on the spring stops the shaft end at a position spaced from the cavity end wall to thereby normally prevent full insertion of the shaft in the knob cavity. The tab is constructed to yield at a predetermined axial force on the knob to allow full insertion of the shaft in the cavity, thereby causing collapse of the knob assembly.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a partially cross-sectioned side view of a collapsible control knob assembly in an instrument panel according to the invention;

FIG. 2 is a cross section of the knob assembly of FIG. 1 in normal operating state;

FIGS. 3 and 4 are side and end views, respectively of a retaining spring according to the invention which is used in the FIG. 1 assembly; and FIG. 5 is a cross section of the knob assembly of FIG. 1 in collapsed state;

FIG. 6 is a cross section of a knob and spring assembly according to another embodiment the invention; and FIG. 7 is an enlarged view of area "A" of FIG. 6.

DESCRIPTION OF THE INVENTION

The knob assembly and retaining spring described herein were specifically developed for use in automotive instrument panels but it will be recognized that the same construction may have other applications wherever such a collapsible knob assembly may be useful.

FIG. 1 depicts a control module 10 behind an instrument panel 12, the module having an actuator shaft 14 extending toward an aperture 16 in the panel 12. A knob 18 carried by the shaft 14 extends through the panel 12 and protrudes sufficiently for easy manipulation as shown in solid lines. The knob may be forced to collapse on the shaft 14 to a second position shown as 18' in dotted lines.

The knob assembly is shown in normal position in FIG. 2. There it is seen that the knob 18 has a cavity 20 terminating at an end wall 22. A retaining spring 24 fits within the cavity and frictionally grips the shaft 14 to hold the knob on the shaft. The retaining spring 24 is the type of spring known as a D-spring but has special features to accomplish the aims of the invention.

The retaining spring 24, also shown in FIGS. 3 and 4, is formed of sheet metal and has a generally cylindrical main body 26 having a D-shaped cross section, thereby having a generally curved wall with a flat side 27. The curved surface has depressed wall portions 28 which bear against the shaft to ensure a secure frictional fit. Flanges 30 extend radially outward from the outer end of the body 26, both from the curved wall and the flat side 27 and abut the end face 32 of the knob 18 to establish the fully inserted position of the spring. A single L-shaped tab 34 extends from the flat side 27 at the inner end of the body 26 and comprises a short axial portion 36 protruding from the body and a radial portion 38 projecting inward from the axial portion 36. The junction of the axial and radial portions is a curved bend 40 with a specified radius. The radius, along with the material and the thickness, determine the yield point of the tab.

When assembled, the spring 24 is inserted into the knob cavity and the flanges 30 form a stop which positions the spring such that the tab 34 is axially spaced from the end wall 22. The tab 34 forms a stop which engages the inner end 36 of the shaft 14, thereby ensuring that the shaft end is also spaced from the end wall 22 of the cavity. The length of the spring relative to the cavity depth determines the amount of the spacing; that spacing should be sufficient to allow the desired amount of collapse of the knob assembly. With the shaft end abutting the tab 34, the knob will protrude beyond the panel 12 as shown in solid lines in FIG. 1. However, if a sufficient force is axially applied to the knob 12, the tab will yield, as shown at 34' in FIG. 5, to permit the knob to be pushed further onto the shaft, thereby assuming the position shown in dotted lines in FIG. 1. Thus in the event of a person's head striking the instrument panel 12, the knob will collapse into the panel to avoid injury to the head.

FIGS. 6 and 7 show an alternative knob assembly which requires a simpler spring construction and a slightly more complex knob structure. The knob 50 has a cavity 52 comprising a stepped bore 54 having an end wall 56, an inner bore 58 adjacent the wall 56 and an outer bore 60. The inner bore has a diameter sufficient to allow insertion of the shaft in the event of a collapsing force, and the outer bore 60 has a slightly larger diameter sufficient to receive the spring 62. The interface of the bores 58 and 60 defines an outward-facing shoulder 64 which affords an abutment engaged by the inner end of the spring 62, thereby fixing the position of the spring in the cavity. The spring 62 is the same as the spring 24 described above except that it has no flanges 30, and can fit wholly within the cavity.

To establish a yield force at the desired value, it is necessary to take into account the material of spring, the tab thickness and width, and the radius. As an example, using die cast steel having Rockwell hardness C42–C46 and 0.25 mm thick, a tab width of 2 mm, a radial length of 1.5 mm, and a radius 40 of 0.5 mm, a yield force of 150N was obtained. That is, an axial impact force of 150N applied to the knob is required to deform the tab and collapse the knob assembly.

It will be apparent that the retaining spring structure and the knob assembly using the spring results in a knob which protrudes from the panel for easy manipulation, yet offers no threat of bodily injury. Moreover, since a retaining spring of some type is normally used for securing a knob to a shaft, the proposed knob assembly requires no additional parts and has little or no increased cost to obtain the capability to collapse under impact.

The embodiments of the invention in which an exclusive property or privilege is claimed are defined as follows:

1. A collapsible knob assembly comprising:

a rotatable shaft for actuating a control device;

a knob on the shaft having a cavity for receiving an end of the shaft, the cavity having an inner end wall;

a retention spring within the cavity and surrounding the shaft for frictionally securing the knob to the shaft;

first stop means on the spring for engaging the shaft and for holding the shaft end spaced from the end wall of the cavity; and second stop means for holding the spring fixed in the cavity;

one of the stop means comprising means for deforming under stress to allow collapse of the assembly upon axial impact on the knob including yieldable element on the spring, thereby moving the end wall of the cavity toward the shaft end upon impact.

2. The invention as defined in claim 1 wherein the first stop means comprises a yieldable tab on the spring spaced from the end wall of the cavity for holding the shaft end spaced from the end wall.

3. The invention as defined in claim 1 wherein the second stop means comprises a portion of the spring which abuts the knob to fix the spring position in the knob cavity.

4. The invention as defined in claim 1 wherein:

the spring includes a body portion contained within the cavity of the knob; and the second stop means comprises a flange which extends radially outwardly from the body to abut a surface of the knob.

5. The invention as defined in claim 1 wherein:

the spring includes a body portion contained within the cavity of the knob and having an inner end spaced from the end wall of the cavity and an outer end adjacent an outer surface of the knob;

the first stop means comprises a tab on the inner end extending inward to abut the shaft end;

the second stop means comprises a flange which extends radially outwardly from the outer end of the body to abut the outer surface of the knob.

6. The invention as defined in claim 5 wherein the body is D-shaped to define a flat side;

the first stop means comprises an L-shaped tab extending from the flat side and defining a bend having a radius, the radius being selected to establish a desired yield force; and the tab further having a portion extending radially inward from the bend.

7. The invention as defined in claim 1 wherein:

the spring includes a body portion contained within the cavity of the knob; and the second stop means comprises a shoulder in the cavity spaced from the end wall, which shoulder abuts the spring.

8. The invention as defined in claim 1 wherein:

the spring includes a body portion contained within the cavity of the knob and having an inner end spaced from the end wall of the cavity and an outer end adjacent an outer surface of the knob;

the first stop means comprises a tab on the inner end extending inward to abut the shaft end;

the cavity comprises a stepped bore which defines a shoulder for engaging the inner end of the spring thereby comprising the second stop means.

9. The invention as defined in claim 8 wherein the stepped bore has a first portion adjacent the end wall with a diameter sufficient to accept the shaft and a second portion with a diameter sufficient to accept the spring.

10. A retention spring for yieldably fixing a shaft in a cavity of a knob comprising:

a sheet metal spring having a body for surrounding and frictionally gripping the shaft;

the spring having first and second stop means integral with the body;

the first stop means comprising an abutment for limiting insertion of the shaft into the knob cavity;

the second stop means comprising a spring portion for engaging the knob to fix the spring position in the cavity; and means comprising one of the stop means for yielding upon application of an axial force to effect full insertion of the shaft into the cavity.

11. The invention as defined in claim 10 wherein the means comprising one of the stop means is L-shaped and comprises an axial portion extending from the spring body and a radial portion joined by a radius to the axial portion, wherein the radius affects the impact force required to cause the means comprising one of the stop means to yield.

12. The invention as defined in claim 10 wherein:

the body is D-shaped to define a flat side;

the first stop means comprises an L-shaped tab extending from the flat side and defining a bend having a radius, the radius being selected to establish a desired yield force; and the tab further having a portion extending radially inward from the bend.

13. The invention as defined in claim 10 wherein the first stop means comprises a yieldable tab on a first end of the spring body extending inward for engaging the shaft and subject to deformation upon application of an axial impact force to allow full insertion of the shaft into the cavity.

14. The invention as defined in claim 10 wherein the second stop means comprises an inner end of the spring body which is adapted to engage a feature of the knob.

15. The invention as defined in claim 10 wherein the second stop means comprises a flange extending outward from an outer end of the spring body to engage a surface of the knob.

* * * * *